United States Patent
Awazu et al.

(10) Patent No.: US 11,066,724 B2
(45) Date of Patent: Jul. 20, 2021

(54) METHOD FOR SEPARATING METAL COMPONENTS

(71) Applicants: SUMITOMO ELECTRIC INDUSTRIES, LTD., Osaka (JP); NATIONAL INSTITUTE OF ADVANCED INDUSTRIAL SCIENCE AND TECHNOLOGY, Tokyo (JP)

(72) Inventors: Tomoyuki Awazu, Itami (JP); Masatoshi Majima, Itami (JP); Mitsutaka Tsubokura, Osaka (JP); Tetsuo Oishi, Tsukuba (JP)

(73) Assignees: SUMITOMO ELECTRIC INDUSTRIES, LTD., Osaka (JP); NATIONAL INSTITUTE OF ADVANCED INDUSTRIAL SCIENCE AND TECHNOLOGY, Tokyo (JP)

(*) Notice: Subject to any disclaimer, the term of this patent is extended or adjusted under 35 U.S.C. 154(b) by 442 days.

(21) Appl. No.: 16/066,737

(22) PCT Filed: Dec. 27, 2016

(86) PCT No.: PCT/JP2016/088977
§ 371 (c)(1),
(2) Date: Jun. 28, 2018

(87) PCT Pub. No.: WO2017/119374
PCT Pub. Date: Jul. 13, 2017

(65) Prior Publication Data
US 2019/0017144 A1    Jan. 17, 2019

(30) Foreign Application Priority Data
Jan. 5, 2016 (JP) .............................. JP2016-000555

(51) Int. Cl.
*C22B 3/00* (2006.01)
*C22B 3/12* (2006.01)
(Continued)

(52) U.S. Cl.
CPC ................ *C22B 3/12* (2013.01); *C22B 3/045* (2013.01); *C22B 3/06* (2013.01); *C22B 3/10* (2013.01);
(Continued)

(58) Field of Classification Search
CPC . C22B 3/00–42; C22B 1/02–10; C22B 59/00; C01B 33/26; Y02P 10/234; C25C 3/00–34
See application file for complete search history.

(56) References Cited

U.S. PATENT DOCUMENTS 7,063,824 B1 * 6/2006 Coetzee ................. C01G 25/00
423/419.1

FOREIGN PATENT DOCUMENTS

JP    S49-77899 A    7/1974
JP    S61-238930 A    10/1986
(Continued)

OTHER PUBLICATIONS

Translation of JP-49-077899, Jul. 1974.*
(Continued)

*Primary Examiner* — Steven J Bos
(74) *Attorney, Agent, or Firm* — Faegre Drinker Biddle & Reath LLP (57) ABSTRACT

A method for separating metal components from a treatment material containing a silicate and metal elements includes: a reaction step of reacting the treatment material and a molten alkali hydroxide in which bubbles due to water vapor derived from water are generated by heating a hydroxide of an alkali metal or an alkaline-earth metal and the water in a
(Continued)

state where the hydroxide and the water coexist, to obtain a reaction product; and a first precipitation step of dissolving the reaction product of the treatment material and the molten alkali hydroxide after the reaction step in water, thereby generating a precipitate containing the metal elements.

22 Claims, 4 Drawing Sheets

(51) Int. Cl.
*C22B 3/42* (2006.01)
*C22B 59/00* (2006.01)
*C22B 3/06* (2006.01)
*C25C 3/26* (2006.01)
*C25C 3/30* (2006.01)
*C22B 47/00* (2006.01)
*C25C 3/34* (2006.01)
*C22B 34/10* (2006.01)
*C22B 3/44* (2006.01)
*C22B 3/04* (2006.01)
*C22B 3/10* (2006.01)
*C22B 1/02* (2006.01)

(52) U.S. Cl.
CPC .................. *C22B 3/42* (2013.01); *C22B 3/44* (2013.01); *C22B 34/10* (2013.01); *C22B 47/00* (2013.01); *C22B 59/00* (2013.01); *C25C 3/26* (2013.01); *C25C 3/30* (2013.01); *C25C 3/34* (2013.01); *C22B 1/02* (2013.01); *Y02P 10/20* (2015.11)

(56) References Cited

FOREIGN PATENT DOCUMENTS

| | | |
|---|---|---|
| JP | S61-238931 A | 10/1986 |
| JP | H06-127944 A | 5/1994 |
| WO | WO-93/04207 A1 | 3/1993 |

OTHER PUBLICATIONS

Translation of JP-06-127944, May 1994.*
Kenzo Sanematsu, "Kidorui Kosho No Taipu to Sono Takucho (Types and Characteristics of Rare Earth Deposits)," Sansoken TODAY, National Institute of Advanced Industrial Science and Technology, 2009, vol. 9, No. 10, pp. 4-5, including English language translation.

* cited by examiner

METHOD FOR SEPARATING METAL COMPONENTS

TECHNICAL FIELD

The present invention relates to a method for separating metal components. This application claims priority on Japanese Patent Application No. 2016-000555 filed on Jan. 5, 2016, the entire contents of which are incorporated herein by reference.

BACKGROUND ART

NON PATENT LITERATURE 1 describes alkali rock related deposits and ion-adsorption type deposits as deposits for supplying heavy rare earth elements.

CITATION LIST

Non Patent Literature

NON PATENT LITERATURE 1: Kenzo Sanematsu, "Kidorui Kosho No Taipu To Sono Tokucho (Types and Characteristics of Rare Earth Deposits)" Sansoken TODAY, National Institute of Advanced Industrial Science and Technology, 2009, Vol. 9, No. 10, pp. 4-5

SUMMARY OF INVENTION

One aspect of the present disclosure is directed to (1) a method for separating metal components derived from metal elements, from a treatment material containing a silicate and the metal elements, the method including:

a reaction step of reacting the treatment material and a molten alkali hydroxide in which bubbles due to water vapor derived from water are generated by heating a hydroxide of an alkali metal or an alkaline-earth metal and the water in a state where the hydroxide and the water coexist, to obtain a reaction product; and a first precipitation step of dissolving the reaction product of the treatment material and the molten alkali hydroxide after the reaction step in water to generate a precipitate containing the metal elements in an obtained solution.

DESCRIPTION OF EMBODIMENTS

Problems to be Solved by Disclosure

Alkali rock related deposits are present in several areas all over the world and have a lot of reserves. However, rare earth elements are present in very stable crystal structure that forms ores of alkali rock related deposits. Therefore, it is difficult to extract the rare earth elements from the ores, and such rare earth element extraction has not been technically established. Meanwhile, in ion-adsorption type deposits, rare earth elements are not so firmly bound to crystal structure of ores, and thus are relatively easily extracted, so that ion-adsorption type deposits serve as supply sources at present.

However, ion-adsorption type deposits are present only in specific areas, and production areas are unevenly distributed in the world. Thus, supply of rare earth elements from ion-adsorption type deposits is unstable.

Under such circumstances, a technique to extract rare earth elements from alkali rock related deposits containing a large amount of heavy rare earth elements is considered to be able to reduce the risk in supply of heavy rare earth elements. Generally, a rare earth element is extracted from an ore by dissolving the ore in an acid or the like, ionizing the rare earth element, and eluting the rare earth element as ion in the liquid. When it is difficult to dissolve the ore directly in the acid or the like, a pretreatment such as roasting may be performed on the ore before the ore is dissolved in the acid or the like.

However, for example, in the case of treating an ore containing a silica component ($SiO_2$) as a main component such as eudialyte, the following problems have been found to arise in the above-described conventional method.

The first problem is that it is difficult to dissolve the ore in the acid or the like. Since eudialyte contains a chemically stable silicate-based mineral as a main component, eudialyte cannot easily be dissolved in an acid or the like. In order to dissolve eudialyte in the acid or the like, it is necessary to use a large amount of the acid. In addition, in order to dissolve eudialyte in the acid or the like, heating is also often required. Moreover, even when eudialyte is successfully dissolved in the acid or the like, the concentration of the rare earth element in the obtained solution is very low. Thus, this decreases the efficiency of a rare earth element separating step, such as filtration, which is to be performed after the dissolution. Furthermore, after extraction of the rare earth element or the like, the acid remains in a large amount, resulting in an increase in the amount of waste liquid.

The second problem is that a hindrance is also caused in the filtration performed after the ore is dissolved in the acid or the like. As described above, a silica component is present in a large amount in a solution (hereinafter, also referred to as "ore-dissolved acid solution") obtained by dissolving the ore in the acid or the like. The silica component is bound to water in the ore-dissolved acid solution to form silica gel. Silica gel is in a very high viscosity state. Thus, in the filtration step (solid-liquid separation) which is generally performed as an extraction separation treatment, silica gel adheres to a filtration surface of a filter cloth, a filter paper, or the like to cause clogging. Therefore, it becomes very difficult to perform the filtration treatment as required. Furthermore, silica gel may adsorb ions derived from a rare earth element to be extracted or the like, thereby decreasing the amount of the rare earth element or the like collected.

Due to the above-described problems, a process for extracting a rare earth element from eudialyte produced from an alkali rock related deposit is considered not having been put into practical use. In addition, such problems are common to not only the case of using eudialyte but also the case of using a silicate ore containing silicate as a main component.

Therefore, it is an object of the present invention to provide a method that allows metal components to be efficiently separated from a treatment material containing a silicate and metal elements.

Advantageous Effects of Disclosure

According to the present disclosure, metal components can be efficiently separated from a treatment material containing a silicate and metal elements.

Description of Embodiments of Invention

First, contents of embodiments of the present invention will be listed and described.

(1) A method for separating metal components according to an embodiment of the present invention is a method for separating metal components derived from metal elements, from a treatment material containing a silicate and the metal elements, the method including:

a reaction step of reacting the treatment material and a molten alkali hydroxide in which bubbles due to water vapor derived from water are generated by heating a hydroxide of an alkali metal or an alkaline-earth metal and the water in a state where the hydroxide and the water coexist, to obtain a reaction product; and a first precipitation step of dissolving the reaction product of the treatment material and the molten alkali hydroxide after the reaction step in water to generate a precipitate containing the metal elements in an obtained solution.

With the method according to the present embodiment, the metal components can be efficiently separated from the treatment material containing the silicate and the metal elements.

In the present specification, even regarding a material in which a hydroxide of an alkali metal or an alkaline-earth metal and water coexist, a product that is brought into a molten state by heating is referred to as "molten alkali hydroxide".

In addition, the "state where the hydroxide and the water coexist" is not particularly limited as long as a condition for generating bubbles due to water vapor derived from the water is satisfied at the time at which meltage is achieved by heating. The "state where the hydroxide and the water coexist" may be a state formed by using a hydroxide by which a certain amount of water is adsorbed.

(2) The hydroxide and the water are preferably heated at a heating rate of 7° C./min or higher in the reaction step.

(3) The hydroxide and the water are preferably heated at a heating rate of 15° C./min or higher in the reaction step.

(4) In the method according to any one of the above (1) to (3), the hydroxide and the water are preferably heated at a heating rate of 100° C./min or higher in the reaction step.

With the method in which the configuration described in the above (2) to (4) is used, in the reaction step, a sufficient amount of bubbles can be generated in the molten alkali hydroxide, and the molten alkali hydroxide and the treatment material can be more efficiently reacted with each other.

(5) In the first precipitation step, all or part of silicate ions in the reaction product of the treatment material and the molten alkali hydroxide is preferably contained in a liquid component of the solution in which the precipitate is generated.

By separating the silicate ions and the metal elements in the first precipitation step as in the method in which the configuration described in the above (5) is used, generation of silica gel can be inhibited.

(6) The treatment material is preferably a silicate ore.

With the method in which the configuration described in the above (6) is used, metal components can be efficiently separated from even a silicate ore containing a large amount of a silicate.

(7) The treatment material is preferably eudialyte or zircon.

With the method in which the configuration described in the above (7) is used, a metal element, particularly, a rare earth element, can be efficiently separated and collected from eudialyte and zircon, which are ores that contain the rare earth element and that are hard to treat.

(8) The hydroxide of the alkali metal or the alkaline-earth metal is preferably NaOH, KOH, or $Ca(OH)_2$.

With the method in which the configuration described in the above (8) is used, the metal components can be separated from the treatment material by using an inexpensive easily available chemical.

(9) The metal element contained in the treatment material is preferably a rare earth element.

In this case, the rare earth element can be efficiently separated from the treatment material.

(10) The metal element contained in the treatment material is preferably Mn, Zr, or a combination of Mn and Zr.

With the method in which the configuration described in the above (10) is used, for example, when an ore is used as the treatment material, a part of a rare metal contained in the ore can also be separated.

(11) The temperature of the molten alkali hydroxide in the reaction step is preferably not lower than 100° C. and not higher than 600° C.

By controlling the temperature of the molten alkali hydroxide as in the method in which the configuration described in the above (11) is used, the reactivity between the silicate and the metal element can be improved. In addition, the separability between the Si component and the metal components can be finally enhanced due to the increased reactivity of the silicate. In the present specification, the concept of the term "Si component" includes Si itself and a substance containing Si as an element. In addition, the concept of the term "metal components" includes an elemental substance metal derived from the metal element in the treatment material.

(12) An amount of the molten alkali hydroxide in the reaction step is preferably not less than 0.1 times and not greater than 10 times with respect to the treatment material on a mass basis.

By adjusting the amount of the molten alkali hydroxide as in the method in which the configuration described in the above (12) is used, the reactivity between the silicate and the metal element can be improved. In addition, the separability between the Si component and the metal components can be finally enhanced due to the increased reactivity of the silicate.

(13) The method preferably further includes after the reaction step and before the first precipitation step, a keeping step of keeping the molten alkali hydroxide, in which the generation of the bubbles stops, and the treatment material in a state where the molten alkali hydroxide and the treatment material are heated.

With the method in which the configuration described in the above (13) is used, the molten alkali hydroxide and the treatment material can be more sufficiently reacted with each other.

(14) The method preferably further includes
after the first precipitation step,
an acid leaching step of leaching out the metal elements contained in the precipitate into an acid, thereby separating the metal elements from the precipitate.

With the method in which the configuration described in the above (14) is used, the metal components can be effectively leached out and separated from the precipitate having a decreased proportion of the Si component.

(15) The method preferably further includes
after the first precipitation step:
a roasting step of roasting the precipitate; and
an acid leaching step of leaching out the metal elements contained in the precipitate after the roasting step into an acid, thereby separating the metal elements from the precipitate.

With the method in which the configuration described in the above (15) is used, the Si component in the precipitate can be stabilized as a silicon oxide by roasting the precipitate. Therefore, the Si component becomes hard to be leached out into the acid in the acid leaching step performed after the roasting step. Accordingly, with the method in which the configuration described in the above (15) is used, the leaching efficiency of the metal element, particularly, the rare earth element, in the acid leaching step can be improved.

(16) The acid is preferably hydrochloric acid or a sulfuric acid solution.

With the method in which the configuration described in the above (16) is used, the metal components can be more efficiently leached out and separated from the precipitate having a decreased proportion of the Si component.

(17) The method preferably further includes
after the acid leaching step,
a first solvent extraction step of separating the metal elements contained in an acid leachate obtained in the acid leaching step from the acid leachate by solvent extraction to obtain an extract/loaded solvent containing the metal elements.

With the method in which the configuration described in the above (17) is used, the target metal components can be efficiently separated from the acid leachate containing the metal elements leached out from the precipitate, by a general method that is solvent extraction.

(18) The method preferably further includes
after the first solvent extraction step:
a second precipitation step of mixing a precipitant and a loaded/pregnant strip obtained by stripping the metal elements from the extract/loaded solvent obtained in the first solvent extraction step into an aqueous solution, to generate a precipitate containing the metal elements; and
a molten salt electrolysis step of dissolving the precipitate obtained in the second precipitation step in a molten salt and then performing molten salt electrolysis, thereby electrowinning the metal components derived from the metal elements contained in the precipitate.

With the method in which the configuration described in the above (18) is used, the purity of the obtained metal components can be increased.

(19) The method preferably further includes
after the acid leaching step,
an ion exchange step of separating the metal elements contained in an acid leachate obtained in the acid leaching step from the acid leachate by an ion exchange method to obtain an eluate containing the metal elements.

With the method in which the configuration described in the above (19) is used, the target metal can be efficiently separated from the acid leachate containing the metal elements leached out from the precipitate, by a general method that is the ion exchange method.

(20) The method preferably further includes
after the ion exchange step,
a second solvent extraction step of separating the metal elements contained in the eluate, from the eluate by solvent extraction to obtain an extract/loaded solvent containing the metal elements.

With the method in which the configuration described in the above (20) is used, the target metal components can be efficiently separated from the eluate by a general method that is solvent extraction.

(21) In the above (20), the method preferably further includes
after the second solvent extraction step:
a third precipitation step of mixing a precipitant and a loaded/pregnant strip obtained by stripping the metal elements from the extract/loaded solvent obtained in the second solvent extraction step into an aqueous solution, to generate a precipitate containing the metal elements; and
a molten salt electrolysis step of dissolving the precipitate obtained in the third precipitation step in a molten salt and then performing molten salt electrolysis, thereby electrowinning the metal components containing the metal elements contained in the extract/loaded solvent.

With the method in which the configuration described in the above (21) is used, the purity of the obtained metal components can be increased.

(22) The method preferably further includes
after the first precipitation step,
a silicon dioxide generation step of generating silicon dioxide from a supernatant liquid obtained by separating the precipitate from the solution in the first precipitation step.

With the method in which the configuration described in the above (22) is used, the Si component separated from the treatment material can be collected as silicon dioxide, which can be effectively used.

(23) Preferably, the treatment material is eudialyte,
NaOH as the hydroxide and the water are heated at a heating rate of 100° C./min or higher in the reaction step, and
a rare earth metal is separated as the metal components from the treatment material.

With the method in which the configuration described in the above (23) is used, a rare earth metal can be efficiently separated and collected from eudialyte, which is an ore that contains the rare earth element and that is hard to treat.

Details of Embodiments of Invention

Hereinafter, specific examples of a method for separating metal components according to an embodiment of the present invention (hereinafter, also referred to merely as "method according to the present embodiment") will be described. The present invention is not limited to these examples and is indicated by the claims, and is intended to include meaning equivalent to the claims and all modifications within the scope of the claims.

The method according to the present embodiment is a method for separating metal components derived from metal elements, from a treatment material containing a silicate and the metal elements. The method according to the present embodiment is a method including at least a reaction step and a first precipitation step. Hereinafter, each step will be described in detail.

—Reaction Step—

This step is a step of reacting the treatment material and a molten alkali hydroxide in which bubbles due to water vapor derived from water are generated by heating the water and a hydroxide of an alkali metal or an alkaline-earth metal in a state where the hydroxide and the water coexist, to obtain a reaction product.

(Treatment Material)

The treatment material is not particularly limited as long as the treatment material contains a silicate and metal elements. Examples of the treatment material include ores, and home electric appliances and industrial products that have become unnecessary, but are not particularly limited thereto. When the treatment material contains a silicate in a large amount and metal elements are incorporated in the silicate, it is very difficult to separate the metal elements from the treatment material by a conventional method. Meanwhile, with the method according to the present embodiment, the metal elements can be easily and efficiently separated from the treatment material.

The content of the silicate in the treatment material is not particularly limited. In the case where the treatment material is a treatment material in which metal elements are incorporated in a silicate and cannot be separated therefrom by the conventional method, the effects of the method for separating the metal components according to the embodiment of the present invention are more highly exerted. The content of the silicate in the treatment material is preferably not less than 30 mass %, for example. The higher the content of the silicate in the treatment material is, the more effective the method according to the present embodiment is.

In the method according to the present embodiment, the concept of the silicate also includes silicon dioxide ($SiO_2$).

The content of the metal elements in the treatment material is not particularly limited. The content of the metal elements in the treatment material is desirably higher. The content of the metal elements in the treatment material is preferably not less than 5 mass %, for example.

The type of the metal element contained in the treatment material is not particularly limited. The metal element may be any element included in typical elemental metals or transition elemental metals. Examples of the metal elements include, but are not particularly limited to: rare earth elements such as dysprosium (Dy), neodymium (Nd), praseodymium (Pr), terbium (Tb), europium (Eu), and ytterbium (Yb); manganese (Mn); zirconium (Zr); calcium (Ca); iron (Fe); and tantalum (Ta). Among these metal elements, rare earth elements, manganese, zirconium, and a combination of manganese and zirconium are preferable. This is because, with the method according to the present embodiment, these metal elements can be particularly efficiently separated from the treatment material.

In the case where the treatment material is an ore, the treatment material is preferably a silicate ore, for example. Ores forming alkali rock related deposits contain heavy rare earth elements in relatively large amounts, and a heavy rare earth element can be efficiently separated by using, as the treatment material, a silicate ore whose reserves are large in the world. Examples of the silicate ore include eudialyte, zircon, elpidite, and mosandrite, but are not particularly limited thereto. Among these silicate ores, when eudialyte or zircon, which are ores that contain a rare earth element and that are hard to treat, is used, a metal element, particularly, a rare earth element, can be efficiently separated and collected.

In addition, in the case where the treatment material is an industrial product or the like, examples of the treatment material include glass, optical fibers made of glass, catalysts, and polishing agents, but are not particularly limited thereto.

(Molten Alkali Hydroxide)

The molten alkali hydroxide is formed by heating the hydroxide of the alkali metal or the alkaline-earth metal and the water in a state where the hydroxide and the water coexist. When the molten alkali hydroxide contains water, bubbles due to water vapor are generated in the molten alkali hydroxide. When bubbles are generated in the molten alkali hydroxide, the reaction between the molten alkali hydroxide and the treatment material easily proceeds. Thus, the molten alkali hydroxide, and the silicate and the metal components in the treatment material can be efficiently reacted with each other.

Examples of the hydroxide of the alkali metal or the alkaline-earth metal include, but are not particularly limited to, hydroxides of alkali metals such as lithium (Li), sodium (Na), and potassium (K) and hydroxides of alkaline-earth metals such as calcium (Ca). The hydroxide of the alkali metal or the alkaline-earth metal is preferably sodium hydroxide (NaOH), potassium hydroxide (KOH), or calcium hydroxide ($Ca(OH)_2$), for example. Generally, sodium hydroxide, potassium hydroxide, and calcium hydroxide are inexpensive and easily available. Thus, the use of sodium hydroxide, potassium hydroxide, or calcium hydroxide can reduce the cost for separating the metal components. In addition, the use of sodium hydroxide, potassium hydroxide, or calcium hydroxide allows the metal components to be efficiently separated from the treatment material. These hydroxides of the alkali metals or the alkaline-earth metals may be used singly, or two or more of these hydroxides may be mixed and used.

From the viewpoint of more assuredly separating, from the treatment material, the metal element to be separated, the alkali metal element or the alkaline-earth metal element contained as an element in the hydroxide is a different type of metal element from the metal element to be separated. For example, when the metal element to be separated is calcium, a substance other than calcium hydroxide is used as the hydroxide of the alkali metal or the alkaline-earth metal from the viewpoint of more assuredly separating the calcium from the treatment material.

The amount of the water in a mixture of the hydroxide of the alkali metal or the alkaline-earth metal and the water in a state where the hydroxide and the water coexist needs to be at least an amount that allows bubbles of water vapor to be generated in a sufficient amount to start the reaction. On the other hand, the amount of the water in the mixture of the hydroxide and the water needs to be an amount that can inhibit excessive generation of water vapor. The water vapor amount required for starting the reaction and the water amount that can inhibit excessive generation of water vapor largely change depending on the properties of the treatment material, the shape of a container used for the reaction, the size of the container, and the like, and thus cannot be determined unconditionally. However, in view of the type of an hydroxide of an alkali metal or an alkaline-earth metal, the type of a treatment material, the shape of a reaction container, and the size of a reaction container that are industrially general, the amount of the water per 100 g of the hydroxide of the alkali metal or the alkaline-earth metal, including moisture adsorbed by the hydroxide, is preferably not less than 0.1 g and not greater than 10 g.

In heating the hydroxide of the alkali metal or the alkaline-earth metal and the water, heating may be performed at a heating rate at which the water that coexists with the hydroxide is not detached from the mixture of the hydroxide and the water and the coexistent state is maintained, until the hydroxide is melted by the heating. Accordingly, bubbles of water vapor derived from the water can be generated in the molten alkali hydroxide.

As the heating rate during heating of the hydroxide and the water increases, the amount of the water remaining in the molten alkali hydroxide increases, and thus a larger amount of bubbles due to water vapor can be generated in the molten alkali hydroxide. A larger amount of bubbles generated can further promote progress of the reaction between the treatment material and the molten alkali hydroxide.

From the viewpoint of promoting progress of the reaction between the treatment material and the molten alkali hydroxide, the heating rate during heating of the hydroxide and the water is preferably not less than 7° C./min, more preferably not less than 15° C./min, and further preferably not less than 100° C./min. When the heating rate is not less than 7° C./min, the molten alkali hydroxide and the treatment material can be more efficiently reacted with each other.

NaOH, which is an example of the hydroxide, easily adsorbs the moisture in the atmosphere. Thus, normally, the water content of NaOH is about 2 mass %. Therefore, when NaOH is heated at a heating rate of 100° C./min or higher until reaching 450° C., which is the melting point of the NaOH, the NaOH is melted and bubbles due to water vapor are generated, before the adsorbed water is detached from the NaOH. In addition, when the heating rate is 15° C./min, a state where about half the amount of the water adsorbed by the NaOH is present with the melted NaOH is obtained, and bubbles due to water vapor are generated. Furthermore, also when the heating rate is 7° C./min, the water and the melted NaOH coexist, and bubbles due to water vapor are generated.

The temperature of the molten alkali hydroxide is preferably not lower than 100° C. and not higher than 600° C. When the temperature of the molten alkali hydroxide is not lower than 100° C., bubbles due to water vapor derived from the water can be generated in the molten alkali hydroxide. In addition, when the temperature of the molten alkali hydroxide is not higher than 600° C., the reaction is easily caused to proceed, and a disadvantage can also be inhibited from being caused in terms of energy cost. From the viewpoint of generating the bubbles in the molten alkali hydroxide, and easily causing the reaction to proceed and also inhibiting a disadvantage from being caused in terms of energy cost, the temperature of the molten alkali hydroxide is more preferably not lower than 300° C. and not higher than 600° C. and further preferably not lower than 350° C. and not higher than 500° C.

The amount of the molten alkali hydroxide in the reaction step is preferably not less than 0.1 times and not greater than 10 times with respect to the treatment material on a mass basis. When the amount of the molten alkali hydroxide is not less than 0.1 times with respect to the treatment material on a mass basis, the molten alkali hydroxide and the silicate contained in the treatment material can be reacted with each other to a certain extent. In addition, when the amount of the molten alkali hydroxide is not greater than 10 times with respect to the treatment material on a mass basis, an increase in energy cost can be inhibited. From the viewpoint of reacting, to a certain extent, the molten alkali hydroxide and the silicate contained in the treatment material and inhibiting an increase in energy cost, the amount of the molten alkali hydroxide with respect to the treatment material is more preferably not less than 0.5 times and not greater than 5 times, and further preferably not less than 1 time and not greater than 3 times.

(Reaction Between Molten Alkali Hydroxide and Treatment Material)

In order to react the molten alkali hydroxide and the treatment material, the treatment material may be immersed into the molten alkali hydroxide in a state where bubbles due to water vapor are generated. The timing at which the treatment material is immersed into the molten alkali hydroxide is not particularly limited. The treatment material may be added when heating the hydroxide of the alkali metal or the alkaline-earth metal and the water, or the treatment material may be added to the molten alkali hydroxide in a state where bubbles due to water vapor are generated.

Generally, when the main component of a silicate ore is silicon dioxide, which is chemically stable, it is very difficult to dissolve the silicate ore. On the other hand, in the method according to the present embodiment, since bubbles are generated in the molten alkali hydroxide, the effect of agitating the molten alkali hydroxide and the treatment material is produced. Therefore, in the method according to the present embodiment, the area of contact between the molten alkali hydroxide and the treatment material can be increased. As a result, the silicate and the metal element contained in the treatment material can be reacted with the molten alkali hydroxide and ionized. Since the silicate also reacts with the molten alkali hydroxide, even when the metal element is incorporated in the structure of the silicate in the treatment material, the metal element together with the silicate can be reacted with the molten alkali hydroxide.

From the viewpoint of increasing the area of contact between the molten alkali hydroxide and the treatment material, the treatment material is preferably pulverized as finely as possible in advance.

As described above, in the initial state to react the molten alkali hydroxide and the treatment material, the reaction can be immediately started when bubbles of water vapor are generated in the molten alkali hydroxide, but the reaction cannot be started unless such bubbles are generated. Meanwhile, once the reaction starts, water is produced by reaction between the silicate and hydroxide ion ($OH^-$) in the molten alkali hydroxide. An agitation effect occurs by the produced water being heated to generate bubbles of water vapor. Therefore, in the reaction step, bubbles due to water vapor only need to be generated in the molten alkali hydroxide at least in the initial state of the reaction, and it is not particularly necessary to supply water into the molten alkali hydroxide after the reaction proceeds.

—Keeping Step—

This step is a step of keeping the molten alkali hydroxide in which the generation of bubbles due to water vapor has stopped and the treatment material in a state where the molten alkali hydroxide and the treatment material are heated. The later-described first precipitation step may be performed immediately after the generation of bubbles from the molten alkali hydroxide stops. However, the molten alkali hydroxide and the treatment material can be more sufficiently reacted with each other when the keeping step is performed before the first precipitation step.

—First Precipitation Step—

This step is a step of dissolving the reaction product of the treatment material and the molten alkali hydroxide after the reaction step in water to generate a precipitate containing the metal elements in an obtained solution.

By mixing the reaction product, in which the silicate and the metal elements are ionized and dissolved, and water to dissolve the reaction product in the water, silicate ions and metal element ions dissolved in the reaction product can be separated from each other. That is, whereas the silicate ion tends to be dissolved in water, the metal element ion forms a hydroxide or the like to become a solid and precipitates. By separating the solid from the aqueous solution by means of filtration or the like, the Si component and the metal components contained in the treatment material can be separated from each other without generating a large amount of silica gel that decreases the efficiency of the filtration step.

In the first precipitation step, the separation ratio of the metal components and the Si component can be increased by adjusting the mixing ratio of the reaction product and the water. Accordingly, all or part of the silicate ions dissolved in the reaction product can be contained in the supernatant liquid, that is, in the liquid component of the solution after the precipitate is generated. When the amount of the water mixed with the reaction product is excessively small, the dissolution does not sufficiently proceed. On the other hand, when the amount of the water mixed with the reaction product is excessively large, the amount of the liquid to be treated excessively increases, which is inefficient. Therefore, the amount of the water mixed with the reaction product is preferably not less than 1 time and not greater than 100 times and further preferably not less than 2 times and not greater than 50 times, with respect to the reaction product on a mass basis. In Examples described later, the amount of the water mixed with the reaction product of the treatment material and the molten alkali hydroxide after the reaction step was set to be not less than 2.5 times and not greater than 6.25 times with respect to the reaction product on a mass basis.

In the method according to the present embodiment, by performing an acid leaching step after the first precipitation step, the metal components can be leached out into an acid and collected from the precipitate containing the metal elements. In addition, when a plurality of types of metal elements are contained in the treatment material, a plurality of types of metal ions of these metal elements are contained in the acid, and thus desired metal components can be separated and collected by performing a solvent extraction step or an ion exchange step subsequently to the acid leaching step. Which of the solvent extraction step and the ion exchange step is to be performed may be selected as appropriate in accordance with the type of the metal components to be separated and collected.

In addition, in the method according to the present embodiment, by performing a molten salt electrolysis step after the first precipitation step, desired metal components can also be separated and collected from the precipitate containing the metal elements.

Whether the acid leaching step and the solvent extraction step or the ion exchange step are to be performed after the first precipitation step or the molten salt electrolysis step is to be performed after the first precipitation step may be selected as appropriate in accordance with the metal components to be separated and collected.

—Acid Leaching Step—

This step is a step of leaching out the metal elements contained in the precipitate obtained in the first precipitation step into an acid, thereby separating the metal elements from the precipitate. By performing the acid leaching step, the metal components can be effectively leached out and separated from the precipitate having a low proportion of the Si component.

By immersing the precipitate into the acid, the metal components contained in the precipitate is eluted into the acid. This is because the precipitate is the hydroxide of the metal components, and thus the metal components is eluted by neutralization reaction with the acid. The type of the acid is not particularly limited. Examples of the acid include acid solutions such as a hydrochloric acid solution, a nitric acid solution, and a sulfuric acid solution. The solvent used in the acid solution is normally water. Among these acid solutions, a hydrochloric acid solution, a nitric acid solution, and a sulfuric acid solution are preferable, and a hydrochloric acid solution is more preferable. This is because the metal components can be more efficiently leached out and separated from the precipitate having a low proportion of the Si component.

After the acid leaching step, in order to further increase the purity of the obtained metal components, a series of treatments (treatment procedure A) including a first solvent extraction step, a second precipitation step, and a first molten salt electrolysis step that are described later may be performed, or a series of treatments (treatment procedure B) including an ion exchange step, a second solvent extraction step, a third precipitation step, and a second molten salt electrolysis step that are described later may be performed.

Treatment Procedure A

First Solvent Extraction Step

This step is a step of separating the metal elements contained in an acid leachate obtained in the acid leaching step from the acid leachate by solvent extraction to obtain an extract/loaded solvent (which may also be referred to herein as a "solvent extraction solution") containing the metal elements. When the first solvent extraction step is performed, the metal elements can be efficiently separated from the acid leachate.

The method for separating the metal elements from the acid leachate by solvent extraction is not particularly limited. A publicly known method can be used as the method. For example, an organic solution in which an extractant is dissolved may be added to the acid leachate in which the metal elements are present in an ionized state. Accordingly, a complex can be formed by ions of the metal elements and the extractant, and the metal elements can be extracted and collected as the complex in the organic solution. Examples of the extractant include 2-ethylhexylphosphonic acid 2-ethylhexyl (PC-88A) and di(2-ethylhexyl)phosphoric acid (D2EHPA), but are not particularly limited thereto.

Second Precipitation Step

This step is a step of mixing a precipitant and a loaded/pregnant strip obtained by stripping the metal elements from the solvent extraction solution obtained in the first solvent extraction step into an aqueous solution, to generate a precipitate containing the metal elements. Examples of the precipitant include oxalic acid compounds such as oxalic acid, but are not particularly limited thereto.

In the second precipitation step, the amount (number of moles) of the precipitant added to the loaded/pregnant strip can be determined as appropriate in accordance with the type of the metal components to be separated and the number of moles of the metal components in the loaded/pregnant strip. Specifically, in consideration of a stoichiometric ratio of a precipitate formed by reaction between the precipitant and the metal components to be separated which is present in the loaded/pregnant strip, the number of moles of the precipitant that achieves the stoichiometric ratio of the precipitate, with respect to the number of moles of the metal components in the loaded/pregnant strip, is used as a reference amount for the amount of the precipitant added. When the amount of the precipitant added is larger with respect to the reference amount, precipitation assuredly occurs, but the chemical cost is increased. On the other hand, when the amount of the precipitant added is excessively smaller with respect to the reference, precipitate formation does not sufficiently proceed. Therefore, an adequate amount can be selected in consideration of these facts. From such a viewpoint, the amount of the precipitant added is normally determined with, as the reference amount, an amount that allows the added precipitant to react with all the metal components to be separated which is contained in the loaded/pregnant strip, without excess and deficiency, to form a precipitate. The amount of the precipitant added is preferably not less than 1 time and not greater than 10 times of the reference amount, more preferably not less than 1.1 times and not greater than 5 times of the reference amount, and further preferably not less than 1.2 times and not greater than 2 times of the reference amount. For example, in the case where the precipitate is an oxalate of a rare earth metal, the ratio of rare earth metal ion and oxalate ion that react with each other without excess and deficiency (rare earth metal ion/oxalate ion) is 1/1.5 as a stoichiometric ratio of the precipitate [$RE_2(C_2O_4)_3$; wherein RE represents the rare earth metal]. When the case of a loaded/pregnant strip containing 1 mole of rare earth metal ion is taken as an example in this system, the amount of added oxalate ion derived from the precipitant is preferably not less than 1.5 moles and not greater than 15 moles, more preferably not less than 1.65 moles and not greater than 7.5 moles, and further preferably not less than 1.8 moles and not greater than 3 moles. In this case, the precipitant may be added in a state of oxalic acid.

—First Molten Salt Electrolysis Step—

This step is a step of dissolving the precipitate obtained in the second precipitation step, in a molten salt and then performing molten salt electrolysis, thereby electrowinning the metal elements contained in the precipitate.

By performing the molten salt electrolysis step, the metal components can be effectively extracted and separated from the precipitate having a low proportion of the Si component. In electrolysis in an aqueous solution, a metal element less noble than hydrogen, in particular, a rare earth element, cannot be deposited as a metal by reducing an ion, an oxide, or the like thereof contained in the aqueous solution. However, in the first molten salt electrolysis step, metal ion derived from such a metal element such as a rare earth metal, an oxide derived from the metal element, or the like can be reduced by electrolysis in the molten salt and deposited as a metal.

The method for separating the metal elements from a precipitate resulting from the molten salt electrolysis is not particularly limited as long as the method is a method in which the precipitate containing the metal elements and obtained as described above is used as a starting material. A publicly known method can be used as the method.

For example, by dissolving the precipitate containing the metal elements in a molten salt and controlling electric potential in a state where a pair of electrodes are disposed in the molten salt, the metal elements can be deposited on the surface of the electrode. In the case where the metal components to be separated and collected is a rare earth metal, collection by molten salt electrolysis is particularly effective. For example, even when Dy, Nd, and Pr are contained in the precipitate, Dy ion can be selectively alloyed with Ni by using Ni as the material of the cathode electrode and controlling electric potential. Furthermore, by using Ni alloyed with Dy on the surface thereof as the material of the anode electrode, using graphite, Dy, or the like as the material of the cathode electrode, and performing molten salt electrolysis, Dy contained in the alloy of Ni and Dy can be reduced and deposited on the surface of the cathode electrode. Accordingly, high-purity Dy elemental substance can be collected.

Treatment Procedure B

—Ion Exchange Step—

This step is a step of separating the metal elements contained in the acid leachate obtained in the acid leaching step, from the acid leachate by an ion exchange method to obtain an eluate containing the metal elements. When the ion exchange step is performed, the metal elements can be efficiently separated from the acid leachate.

The method for separating the metal elements from the acid leachate by the ion exchange method is not particularly limited. A publicly known method can be used as the method. For example, metal ion may be collected from the acid solution in which the metal elements are ionized, by using an ion exchanger such as an ion exchange resin, an ion exchange membrane, and zeolite, and then metal ions corresponding to desired metal components may be eluted from the ion exchanger.

Second Solvent Extraction Step

This step is a step of separating the metal elements contained in the eluate obtained in the ion exchange step, from the eluate by solvent extraction to obtain a solvent extraction solution containing the metal elements. When the second solvent extraction step is performed, the metal elements can be efficiently separated from the eluate.

The method for separating the metal elements from the eluate by solvent extraction is not particularly limited. A publicly known method can be used as the method. For example, an organic solution in which an extractant is dissolved may be added to the eluate containing metal ion derived from the metal elements. Accordingly, a complex can be formed by the extractant and the metal ion derived from the metal elements, and the metal elements can be extracted and collected as the complex in the organic solution. The extractant is the same as the extractant used in the first solvent extraction step.

Third Precipitation Step

This step is a step of mixing a precipitant and a loaded/pregnant strip obtained by stripping the metal elements from the solvent extraction solution obtained in the second solvent extraction step into an aqueous solution, to generate a precipitate containing the metal elements. The precipitant is the same as the precipitant used in the second precipitation step.

In the third precipitation step, the amount (number of moles) of the precipitant added to the loaded/pregnant strip can be determined in a similar manner to that in the second precipitation step. The amount of the precipitant added is determined with, as the reference amount, an amount that allows the added precipitant to react with all the metal components to be separated which is contained in the loaded/pregnant strip, without excess and deficiency, to form a precipitate. The amount of the precipitant added is preferably not less than 1 time and not greater than 10 times of the reference amount, more preferably not less than 1.1 times and not greater than 5 times of the reference amount, and further preferably not less than 1.2 times and not greater than 2 times of the reference amount.

Second Molten Salt Electrolysis Step

This step is a step of dissolving the precipitate obtained in the third precipitation step, in a molten salt and then performing molten salt electrolysis, thereby electrowinning the metal elements contained in the solvent extraction solution. By performing the second molten salt electrolysis step, the metal components can be effectively extracted and separated from the precipitate having a low proportion of the Si component. In the second molten salt electrolysis step, similar to the first molten salt electrolysis step, metal ion derived from a metal element such as a rare earth metal, an oxide derived from the metal element, or the like can be reduced by electrolysis in the molten salt and deposited as a metal.

The method for separating the metal elements from a precipitate resulting from the molten salt electrolysis is not particularly limited as long as the method is a method in which the precipitate containing the metal elements and obtained in the third precipitation step is used as a starting material. A publicly known method can be used as the method.

For example, by dissolving the precipitate obtained in the third precipitation step in a molten salt and controlling electrical potential in a state where a pair of electrodes are disposed in the molten salt, the metal elements can be deposited on the surface of the electrode. In the case where the metal components to be separated and collected is a rare earth metal, collection by molten salt electrolysis is particularly effective. For example, even when Dy, Nd, and Pr are contained in the precipitate, Dy ion can be selectively alloyed with Ni by using Ni as the material of the cathode electrode and controlling electrical potential. Furthermore, by using Ni alloyed with Dy on the surface thereof as the material of the anode electrode, using graphite, Dy, or the like as the material of the cathode electrode, and performing molten salt electrolysis, Dy contained in the alloy of Ni and Dy can be reduced and deposited on the surface of the cathode electrode. Accordingly, high-purity Dy elemental substance can be collected.

—Roasting Step—

This step is a step of roasting the precipitate after the first precipitation step. After the roasting step, an acid leaching step of leaching out the metal elements contained in the precipitate after the roasting step into an acid, thereby separating the metal elements from the precipitate, is performed. The Si component derived from the treatment material may remain in the precipitate obtained in the first precipitation step. When the precipitate obtained in the first precipitation step contains the Si component derived from the treatment material, for example, the silicate, as described above, a silicon oxide, which is insoluble to an acid, is generated by roasting the precipitate. Therefore, the Si component becomes hard to be leached out into the acid in the acid leaching step performed after the roasting step. Meanwhile, the metal element, particularly, the rare earth element, contained in the precipitate forms an oxide by roasting the precipitate. However, generally, an oxide containing a rare earth element is easily dissolved in an acid as compared to a silicon oxide. Thus, in the case where the method according to the present embodiment includes the roasting step, the leaching efficiency of the metal element, particularly, the rare earth element, in the acid leaching step can be improved.

The roasting temperature may be a temperature at which a stable composite oxide containing the Si component is formed but a stable compound containing the metal element is not formed. The roasting temperature can be determined as appropriate in accordance with the composition of the precipitate or the like. Specifically, the roasting temperature can be set with the softening point of glass as a rough standard. More specifically, from the viewpoint of forming a stable composite oxide containing the Si component and not forming a stable compound containing the metal element, the roasting temperature is preferably not lower than 600° C., more preferably not lower than 700° C., and further preferably not lower than 1000° C.

Prior to the roasting step, an additional substance that forms a stable composite oxide together with Si may be further added to the precipitate. By adding the additional substance to the precipitate, a more stable composite oxide is formed, and thus the roasting temperature can be decreased. For example, the softening point of sodium silicate, which is the most general silicate, is 600° C. By performing roasting at this temperature, a silicate having a relatively low softening point is considered to change to a state close to the initial state before the molten alkali hydroxide treatment. For example, when calcium oxide (CaO) or the like is further added as the additional substance to calcium silicate that is an example of the silicate, the softening point of a mixture of calcium silicate and calcium oxide is expected to be a temperature (700° C.) close to the softening point of soda-lime glass. Therefore, even when the precipitate contains a silicate having a high softening point, an insoluble compound containing the Si component is expected to be generated at a temperature of 700° C. or higher. Furthermore, when the roasting temperature is not lower than 1000° C., the roasting temperature is expected to exceed the softening points of most of the silicates. Therefore, the major part of the Si component contained in the precipitate is considered to be insolubilized by roasting the precipitate at a temperature of 1000° C. or higher. When the additional substance is added such that the composition of a mixture of the precipitate and the additive is a composition for soft glass, the roasting temperature is preferably set to be not lower than 450° C., which is a general softening point of soft glass. Examples of the additional substance include sodium, aluminum, and calcium, but are not particularly limited thereto. The additional substance can be selected from among substances including elements other than the metal elements to be selected.

As described above, desired metal components can be separated and collected from the treatment material.

—Silicon Dioxide Generation Step—

In the method according to the present embodiment, a silicon dioxide generation step of generating silicon dioxide from the supernatant liquid containing the Si component and separated in the first precipitation step is preferably performed. Accordingly, valuables contained in the treatment material can be collected without being left.

This step is a step of generating silicon dioxide from the supernatant liquid. The supernatant liquid is obtained by dissolving the reaction product of the treatment material and the molten alkali hydroxide after the reaction step in water and separating a precipitate from the obtained solution.

The method for generating silicon dioxide from the supernatant liquid is not particularly limited. For example, silicon dioxide ($SiO_2$) can be generated by adjusting the pH of the supernatant liquid with an acid or the like.

EXAMPLES

The present invention will be described below in more detail by means of examples, but these examples are merely illustrative, and the present invention is not limited to these examples. The scope of the present invention is defined by the claims and is intended to include meaning equivalent to the claims and all modifications within the scope of the claims.

Example 1

Figure 1:
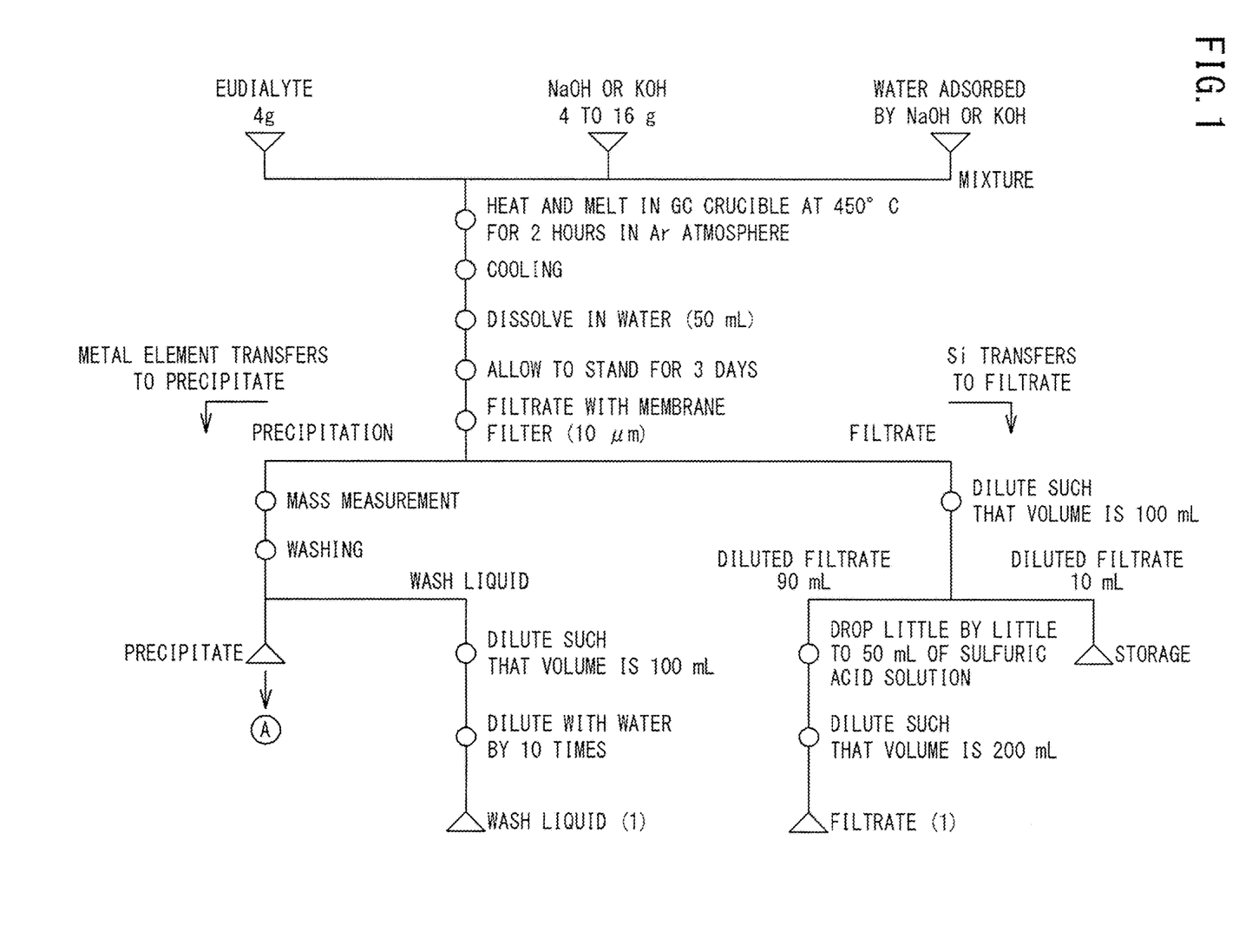
FIG. 1 is a flowchart representing an operation procedure in Example 1.

Metal components was separated from eudialyte, which is a silicate ore, according to a procedure shown in FIG. 1. Hereinafter, a specific procedure will be described in detail.

—Reaction Step and Keeping Step—

The eudialyte and an alkali were mixed such that a mass mixture ratio shown in Table 1 was achieved. Specifically, 4 g of the eudialyte and sodium hydroxide (NaOH) that is the alkali were mixed such that the mass mixture ratio of the eudialyte and the alkali was the ratio of 1 (Treatment Example 1), 2 (Treatment Example 2), or 4 (Treatment Example 3) as the alkali to 1 as the eudialyte, to obtain a mixture. In addition, 4 g of the eudialyte and potassium hydroxide (KOH) that is the alkali were mixed such that the mass mixture ratio of the eudialyte and the alkali was the ratio of 2 as the alkali to 1 as the eudialyte, to obtain a mixture (Treatment Example 4). The moisture in the atmosphere at the time of mixing was adsorbed by NaOH or KOH. The water content of the alkali was about 2 mass %. The eudialyte was pulverized so as to have a particle size of about 300 μm, before being used.

TABLE 1

| Alkali species | Treatment Example 1 NaOH | Treatment Example 2 NaOH | Treatment Example 3 NaOH | Treatment Example 4 KOH |
|---|---|---|---|---|
| Mass mixture ratio (eudialyte:alkali) | 1:1 | 1:2 | 1:4 | 1:2 |

Each mixture obtained was put into a glassy carbon crucible ("GC crucible" in FIG. 1) heated at 450° C. Next, in an Ar atmosphere, the mixture in the crucible was heated to 450° C. at a heating rate of about 150° C./min, and then further heated at 450° C. for 2 hours. Accordingly, the alkali was melted to obtain a mixture of the molten alkali hydroxide and the eudialyte (hereinafter, also referred to as "molten alkali hydroxide-containing mixture"). Simultaneously with this, a silicate derived from the eudialyte and hydroxide ion derived from the molten alkali hydroxide were reacted with each other to obtain a reaction product. NaOH or KOH was melted when 3 to 4 minutes had elapsed from the start of heating. After the melting, bubbles due to water vapor were vigorously generated from the molten alkali hydroxide-containing mixture. In the molten alkali hydroxide-containing mixture, the generation of bubbles due to water vapor continued for about 10 minutes. This is considered to be because water vapor derived from about 2 mass % of the water adsorbed by the alkali was generated in the initial stage of the reaction, and water vapor derived from water produced by reaction between the silicate and the hydroxide ion was generated during progress of the reaction. Even after the generation of bubbles from the molten alkali hydroxide-containing mixture stopped, the molten alkali hydroxide-containing mixture was kept at 450° C. When the obtained reaction product was visually observed, unreacted eudialyte was not confirmed.

—First Precipitation Step—

The obtained reaction product was allowed to cool to room temperature, and then mixed and dissolved in 50 mL of water. The obtained solution was allowed to stand for 3 days. Accordingly, the metal components contained in the eudialyte precipitated as a hydroxide. Thereafter, the solution was filtrated with a membrane filter having a pore size of 10 μm to separate and collect a filtrate (1) and the precipitate.

(Transfer Rates of Each Element to Precipitates)

The eudialyte, which is a raw material ore, and the precipitates obtained in the first precipitation step were subjected to inductively coupled plasma (ICP) analysis to investigate the amounts of elements contained. On the basis of the obtained analysis results, the transfer rate of each element from the raw material ore to each precipitate was calculated. Table 2 shows the results.

TABLE 2

| | Transfer rate of each element (mass %) | | | |
|---|---|---|---|---|
| | Treatment Example 1 | Treatment Example 2 | Treatment Example 3 | Treatment Example 4 |
| Si | 43 | 34 | 25 | 65 |
| Nd | 100 | 100 | 98 | 99 |
| Dy | 98 | 100 | 100 | 100 |
| La | 97 | 99 | 96 | 100 |
| Zr | 100 | 99 | 95 | 99 |
| Ca | 96 | 100 | 92 | 98 |
| Fe | 100 | 99 | 94 | 96 |
| Mn | 76 | 98 | 93 | 97 |

From the results shown in Table 2, the transfer rates of Nd, Dy, La, Zr, Ca, Fe, and Mn to the precipitates are found to be higher than the transfer rates of Si to the precipitates. From these results, Nd, Dy, La, Zr, Ca, Fe, and Mn are found to easily transfer to the precipitates, but Si is found to be less likely to transfer to the precipitates. Therefore, it is found that by performing the reaction step, the keeping step, and the first precipitation step as described above, Nd, Dy, La, Zr, Ca, Fe, and Mn can be separated from Si and collected as a precipitate.

Example 2

—Acid Leaching Step—

Figure 2:
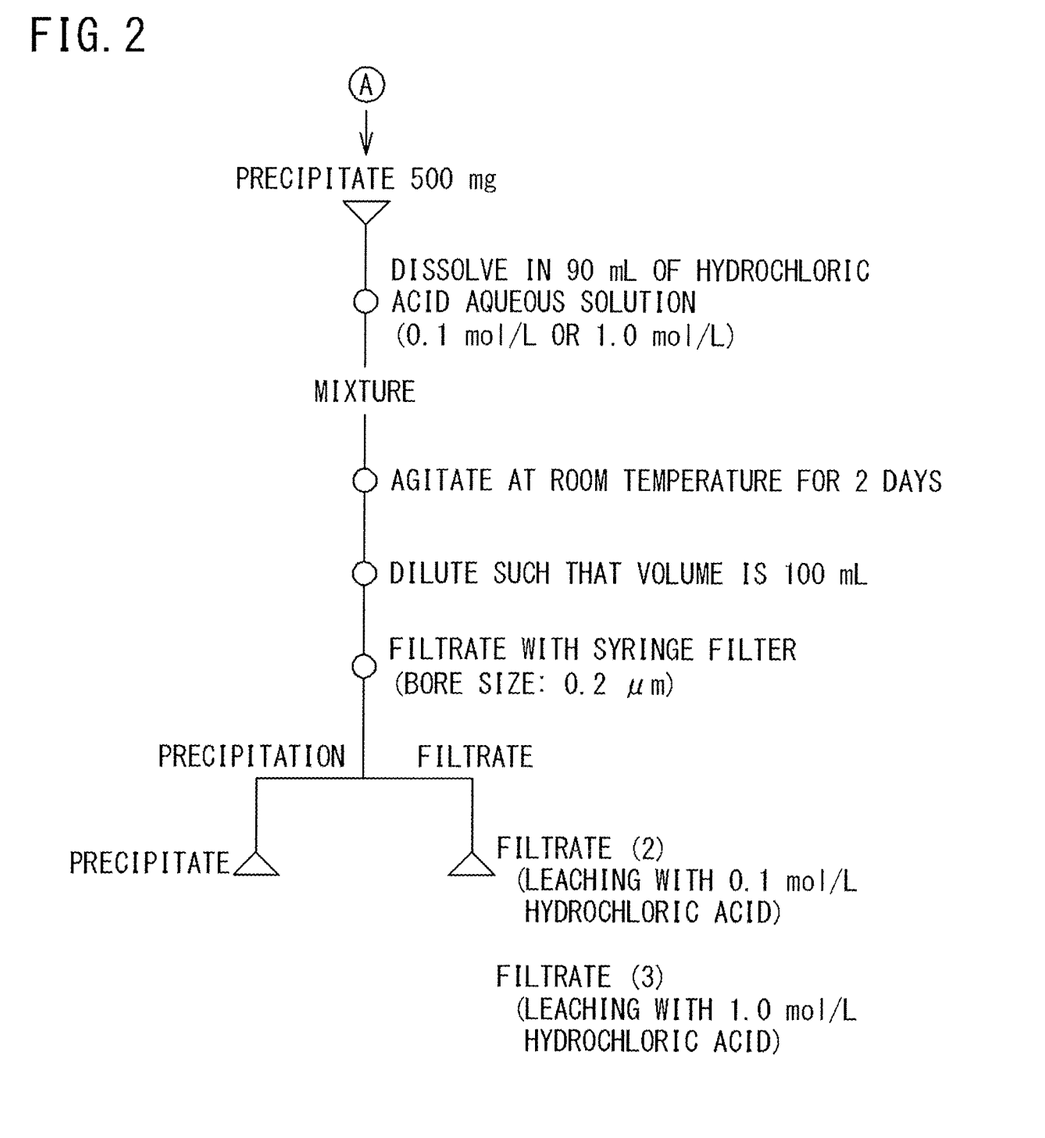
FIG. 2 is a flowchart representing an operation procedure in Example 2.

The metal components was separated from the precipitate obtained in Treatment Example 3 in Example 1, according to a procedure shown in FIG. 2. First, 500 mg of the precipitate was dissolved in 90 mL of a 0.1 mol/L, hydrochloric acid aqueous solution or a 1.0 mol/L hydrochloric acid aqueous solution, to leach out the metal elements. Specifically, first, the mixtures of the precipitate and the hydrochloric acid aqueous solutions were agitated at room temperature for 2 days. After the mixtures were left still, the mixtures were diluted with water such that each of the volumes thereof was 100 mL. The obtained dilutions were filtrated to remove the precipitate from the dilutions, thereby obtaining a filtrate (2) and a filtrate (3) as acid leachates.

(Transfer Rates of Each Element to Filtrates)

The filtrate (2) and the filtrate (3) were subjected to ICP analysis, and the amounts of the metal elements in each filtrate were calculated. The transfer rate of each element from the eudialyte, which is a raw material ore, to each filtrate was further obtained by using the obtained calculation values. Table 3 shows the results.

TABLE 3

| | Transfer rates of each element to filtrates (2) and (3) of Treatment Example 3 (mass %) | |
|---|---|---|
| | Filtrate (2) leached with 0.1 mol/L hydrochloric acid solution | Filtrate (3) leached with 1.0 mol/L hydrochloric acid solution |
| Si | 19 | 21 |
| Nd | 95 | 93 |
| Dy | 78 | 89 |
| La | 88 | 86 |
| Zr | 16 | 9 |
| Ca | 75 | 70 |

TABLE 3-continued

Transfer rates of each element to filtrates (2) and (3) of Treatment Example 3 (mass %)

| | Filtrate (2) leached with 0.1 mol/L hydrochloric acid solution | Filtrate (3) leached with 1.0 mol/L hydrochloric acid solution |
|---|---|---|
| Fe | 65 | 68 |
| Mn | 33 | 36 |

From the results shown in Table 3, since the transfer rates of Si to the filtrates are 19 to 21 mass %, Si is found to be less likely to transfer to the filtrates. On the other hand, regarding the metal components, particularly, rare earth elements such as Nd, Dy, and La, it is found that most of the rare earth elements contained in the raw material ore can be separated and collected in the filtrates.

Comparative Example 1

Similar to Treatment Example 1 in Example 1, 4 g of the eudialyte and 4 g of NaOH were put into a glassy carbon crucible. Then, in an Ar atmosphere, the mixture in the crucible was heated to 450° C. at a heating rate of 5° C./min. As a result, bubbles due to water vapor were generated in the heated mixture, but the degree thereof was gentle as compared to Example 1. When the heated mixture was visually observed, eudialyte considered unreacted was confirmed.

Reference Example

NaOH whose water content became 2 mass % due to adsorption of the moisture in the atmosphere was put into a glassy carbon crucible, and heated so as to reach 450° C. in 60 minutes to melt NaOH, thereby obtaining a molten alkali hydroxide. The heating rate was calculated as 7 to 8° C./min. Generation of bubbles was slightly observed in the molten alkali hydroxide. Therefore, even under the above temperature rise condition, a small amount of water remaining in the molten alkali hydroxide was observed, and thus a state where the small amount of water coexisted with NaOH is considered to be maintained.

Example 3

Figure 3:
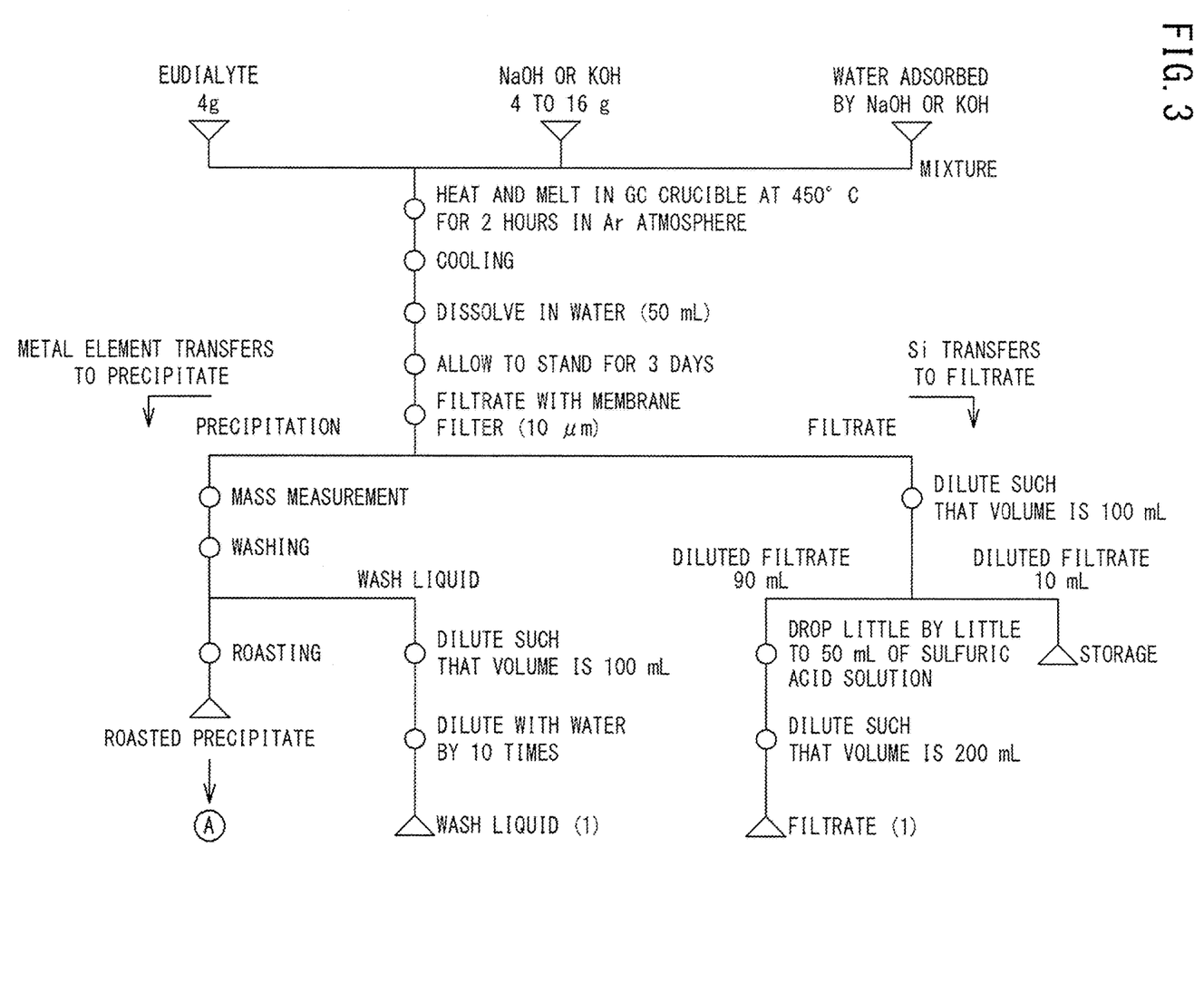
FIG. 3 is a flowchart representing an operation procedure in Example 3.
Figure 4:
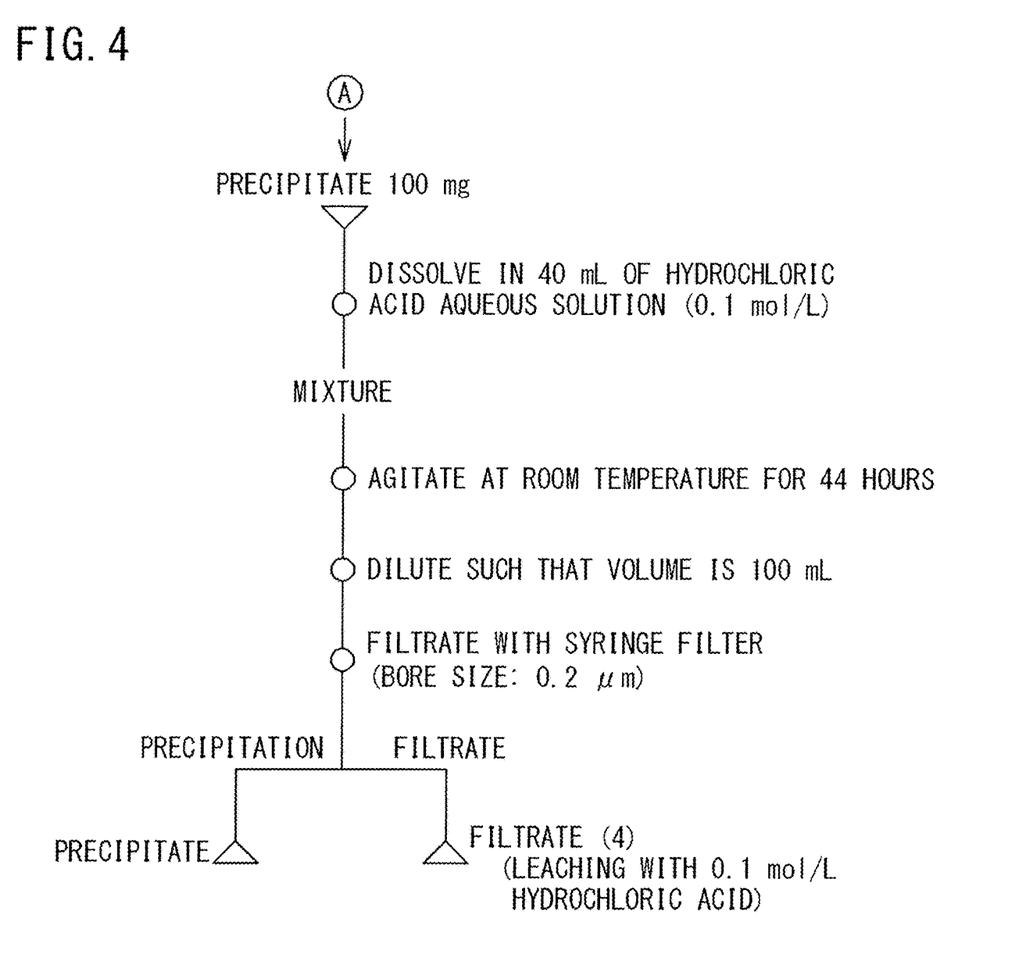
FIG. 4 is a flowchart representing the operation procedure in Example 3.

The metal components was separated from eudialyte, which is a silicate ore, according to a procedure shown in FIG. 3 and FIG. 4. Specifically, first, the same operation as in Treatment Example 3 in Example 1 was performed to obtain a precipitate. The obtained precipitate was roasted for 2 hours at 800° C. (Treatment Example 5) or 1000° C. (Treatment Example 6) as shown in Table 4 (a roasting step). Then, 0.1 g of each of the roasted precipitates was dissolved in 40 mL of a 0.1 mol/L hydrochloric acid aqueous solution to obtain mixtures. The obtained mixtures were agitated at room temperature for 44 hours (an acid leaching step). The agitated mixtures were filtrated to remove the precipitate from the mixtures, thereby obtaining filtrates (acid leachates).

(Transfer Rates of Si to Filtrates)

The filtrates were subjected to ICP analysis, and the amounts of Si in the filtrates were calculated. The transfer rates of Si from the eudialyte, which is a raw material ore, to the filtrates were further obtained by using the obtained calculation values. Table 4 shows the results.

TABLE 4

| | Leaching rate of element (mass %) | | |
|---|---|---|---|
| | Treatment Example 3 | Treatment Example 5 Roasting 800° C. | Treatment Example 6 Roasting 1000° C. |
| Si | 0.29 | 0.19 | 0.11 |

From the results shown in Table 4, the transfer rates of Si to the filtrates of Treatment Example 5 and Treatment Example 6 are found to be lower than the transfer rate of Si to the filtrate of Treatment Example 3 in which roasting was not performed before the acid leaching step. In preparation of the filtrates of Treatment Example 5 and Treatment Example 6, roasting was performed before the acid leaching step. On the other hand, in preparation of the filtrate of Treatment Example 3, roasting was not performed before the acid leaching step. From these results, it is considered that by performing roasting before the acid leaching step, the precipitate was roasted and Si contained in the precipitate before the acid leaching step was stabilized as silicon oxide, so that Si was less likely to be leached out in the subsequent acid leaching step. Therefore, it is found that by performing roasting before the acid leaching step, leaching efficiency of the metal components, particularly, rare earth elements, to an acid improves, and the metal components, particularly, rare earth elements such as Nd, Dy, and La, can be favorably separated from Si.

Example 4

As an additional substance that forms a stable composite oxide together with Si, sodium, aluminum, or calcium is added to the precipitate before roasting is performed in Example 3. Accordingly, Si forms a stable composite oxide and remains in the precipitate. Thus, the transfer rate of Si to the filtrate obtained after the acid leaching step can be further reduced. In addition, since the stable composite oxide is synthesized by using the additional substance that forms a stable composite oxide together with Si, the roasting temperature can be further decreased.

Example 5

An organic solvent in which an extractant is dissolved is added to the acid leachate obtained in Example 3. The obtained mixture is agitated to generate a complex. Accordingly, a solvent extraction solution containing the complex is obtained. Next, the solvent extraction solution and a precipitant (oxalic acid) are mixed to generate a precipitate. Thereafter, the precipitate is dissolved in a molten salt. Molten salt electrolysis is performed by using the obtained mixture. Accordingly, an elemental substance metal can be deposited on an electrode and collected.

Example 6

An ion exchange resin is mixed into the acid leachate obtained in Example 3, and the metal elements contained in the acid leachate are adsorbed by the ion exchange resin. Thereafter, the metal elements adsorbed by the ion exchange resin are eluted to obtain an eluate. An organic solvent in which an extractant is dissolved is added to the eluate. The obtained mixture is agitated to generate a complex. Accordingly, a solvent extraction solution containing the complex is obtained. Next, solvent extraction solution and a precipitant (oxalic acid) are mixed to generate a precipitate. Thereafter, the precipitate is dissolved in a molten salt. Molten salt electrolysis is performed by using the obtained mixture. Accordingly, an elemental substance metal can be deposited on an electrode and collected. Molten salt electrolysis is performed by using the obtained mixture. Accordingly, an elemental substance metal can be deposited on an electrode and collected.

Example 7

The pH of the filtrate (1) obtained in Example 1 is adjusted with an acid to generate silicon dioxide in a supernatant liquid. Accordingly, silicon dioxide can be collected.

The invention claimed is:

1. A method for separating metal components derived from metal elements, from a treatment material containing a silicate and the metal elements, the method comprising:
   a reaction step of reacting the treatment material and a molten alkali hydroxide in which bubbles due to water vapor derived from water are generated by heating a hydroxide of an alkali metal or an alkaline-earth metal and the water in a state where the hydroxide of the alkali metal or the alkaline-earth metal and the water coexist, to obtain a reaction product; and
   a first precipitation step of dissolving the reaction product of the treatment material and the molten alkali hydroxide after the reaction step in water to generate a precipitate containing the metal elements in an obtained solution,
   wherein the hydroxide of the alkali metal or the alkaline-earth metal and the water are heated at a heating rate of 7° C./min or higher in the reaction step.

2. The method for separating the metal components according to claim 1, wherein the hydroxide of the alkali metal or the alkaline-earth metal and the water are heated at a heating rate of 15° C./min or higher in the reaction step.

3. The method for separating the metal components according to claim 1, wherein the hydroxide of the alkali metal or the alkaline-earth metal and the water are heated at a heating rate of 100° C./min or higher in the reaction step.

4. The method for separating the metal components according to claim 1, wherein
   in the first precipitation step,
   all or part of the silicate ions in the reaction product of the treatment material and the molten alkali hydroxide are contained in a liquid component of the solution in which the precipitate is generated.

5. The method for separating the metal components according to claim 1, wherein the treatment material is a silicate ore.

6. The method for separating the metal components according to claim 1, wherein the treatment material is eudialyte or zircon.

7. The method for separating the metal components according to claim 1, wherein the hydroxide of the alkali metal or the alkaline-earth metal is NaOH, KOH, or Ca(OH)$_2$.

8. The method for separating the metal components according to claim 1, wherein the metal element contained in the treatment material is a rare earth element.

9. The method for separating the metal components according to claim 1, wherein the metal element contained in the treatment material is Mn, Zr, or a combination of Mn and Zr.

10. The method for separating the metal components according to claim 1, wherein the temperature of the molten alkali hydroxide in the reaction step is not lower than 100° C. and not higher than 600° C.

11. The method for separating the metal components according to claim 1, wherein an amount of the molten alkali hydroxide in the reaction step is not less than 0.1 times and not greater than 10 times with respect to the treatment material on a mass basis.

12. The method for separating the metal components according to claim 1, further comprising
   after the reaction step and before the first precipitation step,
   a keeping step of keeping the molten alkali hydroxide in which the generation of the bubbles stops and the treatment material in a state where the molten alkali hydroxide and the treatment material are heated.

13. The method for separating the metal components according to claim 1, further comprising
   after the first precipitation step,
   an acid leaching step of leaching out the metal elements contained in the precipitate obtained in the first precipitation step into an acid, thereby separating the metal elements from the precipitate.

14. The method for separating the metal components according to claim 1, further comprising
   after the first precipitation step:
   a roasting step of roasting the precipitate obtained in the first precipitation step; and
   an acid leaching step of leaching out the metal elements contained in the precipitate after the roasting step into an acid, thereby separating the metal elements from the precipitate.

15. The method for separating the metal components according to claim 13, wherein a hydrochloric acid solution is used as the acid.

16. The method for separating the metal components according to claim 13, further comprising
   after the acid leaching step,
   a first solvent extraction step of separating the metal elements contained in an acid leachate obtained in the acid leaching step from the acid leachate by solvent extraction to obtain a solvent extraction solution containing the metal elements.

17. The method for separating the metal components according to claim 16, further comprising
   after the first solvent extraction step:
   a second precipitation step of mixing a precipitant and a loaded/pregnant strip obtained by stripping the metal elements from the solvent extraction solution obtained in the first solvent extraction step into an aqueous solution, to generate a precipitate containing the metal elements; and
   a molten salt electrolysis step of dissolving the precipitate obtained in the second precipitation step in a molten salt and then performing molten salt electrolysis, thereby electrowinning the metal components derived from the metal elements contained in the precipitate.

18. The method for separating the metal components according to claim 13, further comprising
   after the acid leaching step,
   an ion exchange step of separating the metal elements contained in an acid leachate obtained in the acid leaching step from the acid leachate by an ion exchange method to obtain an eluate containing the metal elements.

19. The method for separating the metal components according to claim 18, further comprising
after the ion exchange step,
a second solvent extraction step of separating the metal elements contained in the eluate, from the eluate by solvent extraction to obtain a solvent extraction solution containing the metals element.

20. The method for separating the metal components according to claim 19, further comprising
after the second solvent extraction step:
a third precipitation step of mixing a precipitant and a loaded/pregnant strip obtained by stripping the metal elements from the solvent extraction solution obtained in the second solvent extraction step into an aqueous solution, to generate a precipitate containing the metal elements; and
a molten salt electrolysis step of dissolving the precipitate obtained in the third precipitation step in a molten salt and then performing molten salt electrolysis, thereby electrowinning the metal components derived from the metal elements contained in the solvent extraction solution.

21. The method for separating the metal components according to claim 1, further comprising
after the first precipitation step,
a silicon dioxide generation step of generating silicon dioxide from a supernatant liquid obtained by separating the precipitate from the solution in the first precipitation step.

22. The method for separating the metal components according to claim 1, wherein
the treatment material is eudialyte,
NaOH as the hydroxide of the alkali metal and the water are heated at a heating rate of 100° C./min or higher in the reaction step, and
a rare earth metal is separated as the metal components from the treatment material.

* * * * *